US009002647B1

(12) United States Patent
Sheridan et al.

(10) Patent No.: US 9,002,647 B1
(45) Date of Patent: Apr. 7, 2015

(54) GENERATING TURN-BY-TURN DIRECTION PREVIEWS

(71) Applicant: Google Inc., Mountain View, CA (US)

(72) Inventors: Alan Sheridan, San Jose, CA (US); Daniel Joseph Filip, Los Gatos, CA (US); Jeremy Bryant Pack, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/317,706

(22) Filed: Jun. 27, 2014

(51) Int. Cl.
*G01C 21/32* (2006.01)
*G01C 21/36* (2006.01)
*G06F 17/00* (2006.01)

(52) U.S. Cl.
CPC ........ *G01C 21/3626* (2013.01); *G01C 21/3644* (2013.01)

(58) Field of Classification Search
CPC .......... G01C 21/3636; G01C 21/3647; G01C 21/3679; G06F 17/3087
USPC ......... 701/533, 423, 436, 437, 438, 461, 462; 340/995.2, 995.23, 995.24
See application file for complete search history.

(56) References Cited

U.S. PATENT DOCUMENTS

| | | | |
|---|---|---|---|
| 6,199,014 B1* | 3/2001 | Walker et al. | 701/428 |
| 6,351,710 B1* | 2/2002 | Mays | 701/533 |
| 7,096,428 B2 | 8/2006 | Foote et al. | |
| 7,746,376 B2 | 6/2010 | Mendoza et al. | |
| 7,873,468 B2* | 1/2011 | Matsuura et al. | 701/428 |
| 8,015,172 B1 | 9/2011 | Cave et al. | |
| 8,131,118 B1 | 3/2012 | Jing et al. | |
| 8,493,408 B2 | 7/2013 | Williamson et al. | |
| 2007/0198182 A1* | 8/2007 | Singh | 701/211 |
| 2008/0033641 A1 | 2/2008 | Medalia | |
| 2009/0135178 A1 | 5/2009 | Aihara et al. | |
| 2010/0146397 A1 | 6/2010 | Koch et al. | |
| 2011/0118974 A1* | 5/2011 | Chang et al. | 701/200 |
| 2011/0131597 A1 | 6/2011 | Cera et al. | |
| 2011/0196897 A1 | 8/2011 | Koch et al. | |
| 2011/0211040 A1 | 9/2011 | Lindemann et al. | |
| 2012/0092266 A1 | 4/2012 | Akella | |

(Continued)

OTHER PUBLICATIONS

"Building a Tour (Pano2VR)" [online], retrieved May 5, 2014, <http://ggnome.com/wiki/building_a_Tour_(Pano2VR)>, 14 pages.

(Continued)

*Primary Examiner* — Tan Q Nguyen
(74) *Attorney, Agent, or Firm* — Lerner, David, Littenberg, Krumholz & Mentlik, LLP (57) ABSTRACT

Aspects of the present disclosure relate to generating turn-by-turn direction previews. In one aspect, one or more computing devices, may receive a request for a turn-by-turn direction preview. The one or more computing devices may generate a set of turn-by-turn directions based on a series of road segments connecting a first geographic location and a second geographic location. Each direction in the set of turn-by-turn directions may be associated with a corresponding waypoint. The one or more computing devices then identify a set of images corresponding the series of road segments between two adjacent waypoints of the set of turn-by-turn directions, and determine a subset of the set of images to include in the turn-by-turn direction preview. Subsequently, the one or more computing devices may generate the turn-by-turn direction preview based on at least in part on the determined subset of the set of images.

18 Claims, 9 Drawing Sheets

(56) References Cited

U.S. PATENT DOCUMENTS

| | | | |
|---|---|---|---|
| 2013/0018574 A1 | 1/2013 | Adler | |
| 2013/0090850 A1* | 4/2013 | Mays | 701/533 |
| 2013/0103303 A1* | 4/2013 | Lynch | 701/410 |
| 2013/0191359 A1 | 7/2013 | Meadow et al. | |

OTHER PUBLICATIONS

"Easypano the Virtual Tour Way" [online], Copyright 2001-2014, <http://www.easypano.com/video-tutorial/>, 1 page.

"Google Business Photos Trusted Agency Training", [online], retrieved Feb. 10, 2013, <https://sites.google.com/google.com/trusted-agency-training/en/pano-editor>, 23 pages.

"Google Earth Outreach Storytelling with maps using Tour Builder", [online], retrieved May 5, 2014, <https://www.google.com/earth/outreach/tutorials/tourbuilder.html>, 38 pages.

"Google Earth Showcase", [online], retrieved May 5, 2014, <https://www.google.com/earth/explore/showcase/>, 5 pages.

"Imagery and Street View Overview" [online], Copyright 2014, <https://support.google.com/maps/answer/3093457?hl=en&rd=1>, 2 pages.

"Kolor Panotour Pro", [online], retrieved Nov. 13, 2013, <http://www.kolor.com/panotour-pro-profesionnal-360- virtual-tour-software-home.html>, 1 page.

"Panotour Pro Documentation", [online], retrieved Nov. 13, 2013, <http://www.autopano.net/wiki-en/action/view/Panotour_Pro_Documentation>, 2 pages.

"Take 100,000 more tours inside Google Earth", Jan. 30, 2013, <https://www.cnet.com/news/take-100000-more-tours-inside-google-earth/>, 3 pages.

"Tour Builder", [online], Copyright 2013, <https://tourbuilder.withgoogle.com/abou/faq>, 1 page.

"Using Tours" [online], Copyright 2014, <https://support.google.com/earth/answer/148174?hl=en>, 4 pages.

Boult, et al., "Omnidirectional Video Applications", VAST Lab, copyright 2000.

Bradley, D. et al. (Oct. 1-2, 2005). Image-Based Navigation in Real Environments Using Panoramas. IEEE International Workshop on Haptic Audio Environments and their Applications (HAVE'2005)—HAVE Manuscript 20. National Research Council of Canada, 5 pages.

Chen, B. et al. (2009). Integrated Videos and Maps for Driving Directions. User Interface Science and Technology (Proceedings of UIST 2009), 9 pages. Retrieved from <http://research.microsoft.com/en-us/um/people/cohen/vdd_webpage/>.

Foote, et al., "FlyCam: Practical Panoramic Video and Automatic Camera Control", FX Palo Alto Laboratory, Inc., copyright 2000, pp. 1419-1422.

Google Street View and Driving Directions. Google Driving View. (© 2011). RedTree Software. This web application can be accessed at: <http://www.redtreesoft.com/Google/GoogleDrivingView.htm>.

Google Street View Hyperlapse. (© 2013). Teehan+Lax Labs. This web application can be accessed at: <http://hyperlapse.tllabs.io/>.

Jeremy Pack, Finding the Best Panoramas, Fall 2011, 5 pages.

Kang, et al., "Virtual Navigation of Complex Scenes using Clusters of Cylindrical Panoramic Images", copyright 1998.

Zhao, Q. et al. (Dec. 2013). Cube2Video: Navigate Between Cubic Panoramas in Real-Time. IEEE Transactions on Multimedia, vol. 15, No. 8, pp. 1745-1754.

\* cited by examiner

GENERATING TURN-BY-TURN DIRECTION PREVIEWS

BACKGROUND

Navigation devices and web-based map interfaces allow users to input different geographic locations and view turn-by-turn directions along various routes connecting those locations. In addition to the turn-by-turn directions, some devices and web-based applications may allow users to view street level panoramic images on or near particular segments of the routes. A street level panoramic image may be a street level picture or photograph containing a wide view of a particular region surrounding an observer. For example, the street level panoramic images may include one or more buildings, such as commercial or residential buildings, various landmarks, trees, vehicles, adjacent roads, etc.

BRIEF SUMMARY

In one aspect, a method for generating turn-by-turn direction previews comprises receiving, using one or more computing devices, a request for a turn-by-turn direction preview, and generating, using the one or more computing devices, a set of turn-by-turn directions based on a series of road segments connecting a first geographic location and a second geographic location, wherein each direction in the set of turn-by-turn directions is associated with a corresponding waypoint. Moreover, the method comprises identifying, using the one or more computing devices, a set of images corresponding the series of road segments between two adjacent waypoints of the set of turn-by-turn directions, and determining, using the one or more computing devices, a subset of the set of images to include in the turn-by-turn direction preview. Further, the method comprises generating, using the one or more computing devices, the turn-by-turn direction preview based on at least in part on the determined subset of the set of images.

In another aspect, a system comprises a memory and one or more computing devices, each of the one or more computing devices having one or more processors, the one or more computing devices being coupled to the memory. The one or more computing devices are configured to receive a request for a turn-by-turn direction preview, and generate a set of turn-by-turn directions based on a series of road segments connecting a first geographic location and a second geographic location, wherein each turn-by-turn direction includes a corresponding waypoint. Further, the one or more computing devices are configured to identify a set of images corresponding the series of road segments between two adjacent waypoints of the set of turn-by-turn directions, determine a subset of the set of images to include in the turn-by-turn direction preview, and generate the turn-by-turn direction preview based on at least in part on the determined subset of the set of images.

In yet another aspect, a non-transitory, tangible computer-readable medium on which instructions are stored, the instructions, when executed by one or more computing devices perform a method, the method comprises receiving a request for a turn-by-turn direction preview, and generating a set of turn-by-turn directions based on a series of road segments connecting a first geographic location and a second geographic location, wherein each turn-by-turn direction includes a corresponding waypoint. Moreover, the method comprises identifying a set of street level panoramic images for each road segment between two adjacent waypoints of the set of turn-by-turn directions, and determining whether any street level panoramic images of the set of street level panoramic images is outside a threshold distance from each of the two adjacent waypoints. Based on the determination, the method comprises filtering the set of street level panoramic images to remove the street level panoramic images that are outside the threshold distance, and generating the turn-by-turn direction preview based on at least the filtered set of street level panoramic images.

DETAILED DESCRIPTION

Overview

The present disclosure is directed to generating previews from turn-by-turn directions. For example, a user may request a set of turn-by-turn directions between geographic locations. The user may also want to preview the turn-by-turn directions before taking the route. In response, a turn-by-turn direction preview may be generated for the route. Accordingly, a user may be able to dynamically preview, for example, images (including panoramic images) of various locations and waypoints along the route. As used herein, the term waypoint encompasses its plain and ordinary meaning, including, but not limited to, a point along a route which helps define the route or directions along the route. For example, a waypoint may be a point along a road included in directions; a landmark, monument, or business establishment along the route; a location at or near a turn to be made in directions, etc.

In response to a request for turn-by-turn direction preview between or among various locations, map information, such as road segments, may be used to determine a set of turn-by-turn directions and a route. Each road segment may be associated with one or more unique identifiers that describe the road segment's overall shape, orientation, location, speed limits, landmarks and/or establishments near the road segment, etc. In one example, a series of these road segments may be connected to generate the set of turn-by-turn directions and a route between two locations. Moreover, each turn in the set of turn-by-turn directions may be considered a waypoint. In that regard, two waypoints may be connected by one or more road segments.

Once a set of turn-by-turn directions is determined, a turn-by-turn direction preview of the route may be generated from the images associated with the series of road segments of the turn-by-turn directions. For example, each road segment may be associated with a set of images (e.g., street level panoramic images) captured by a camera that has previously moved along the road segment. The number of panoramic images in each set, for instance, may be zero or more.

The set of images associated with each road segment of the turn-by-turn direction may be strung together as a larger set of images for a turn-by-turn preview. However, this set of images for the turn-by-turn preview may include a particularly large number of images and may require filtering to remove at least some of the images. For example, images near the waypoints of the turn-by-turn direction may be used to generate the turn-by-turn direction preview while images further away may be excluded. In this regard, the filtering process reduces the number of images to lessen the likelihood of losing a user's interest during the preview. The preview may also transition one panoramic image to another using various transition techniques, such as crossfading or image jumping.

The set of images for the turn-by-turn direction preview may be filtered based on various factors, such as irrelevancy or repetitiveness. For example, images beyond a certain distance (e.g., 0.25 miles) from the waypoints along the route may be excluded from the turn-by-turn direction preview. In another example, only a threshold number (e.g., 10) of images associated with each road segment may be included in the set of images for the turn-by-turn preview. In yet a further example, only images at predetermined intervals along each road segment (e.g., every 5 miles) may be included. For instance, if the distance along a road segment is greater than x miles (e.g., 80 miles), only the images at every y miles (e.g., 8 miles) are included in the set of images for the turn-by-turn preview.

In yet another example, images corresponding to distinguishing points along the route may be included in the set of images for a turn-by-turn direction preview. For example, images depicting transitions from road to bridge and vice versa as well as images of landmarks may be included. Such landmarks may be included based on visitation data (e.g., oft-visited vista points), popularity, including how many times photos have been taken of an area or object (e.g., many photos are known to be taken of interesting monuments such as water towers that appear to be other objects), and the like.

The above-described turn-by-turn direction preview may be instantly and dynamically generated without the need to pre-compile all the images for a given route into a video in advance. Moreover, by filtering one or more panoramic images associated with each road segment of a route, users may be able to preview relevant/useful images and not repetitive ones. Additionally, excluding certain panoramic images may ultimately conserve system resources.

Example Systems

Figure 1:
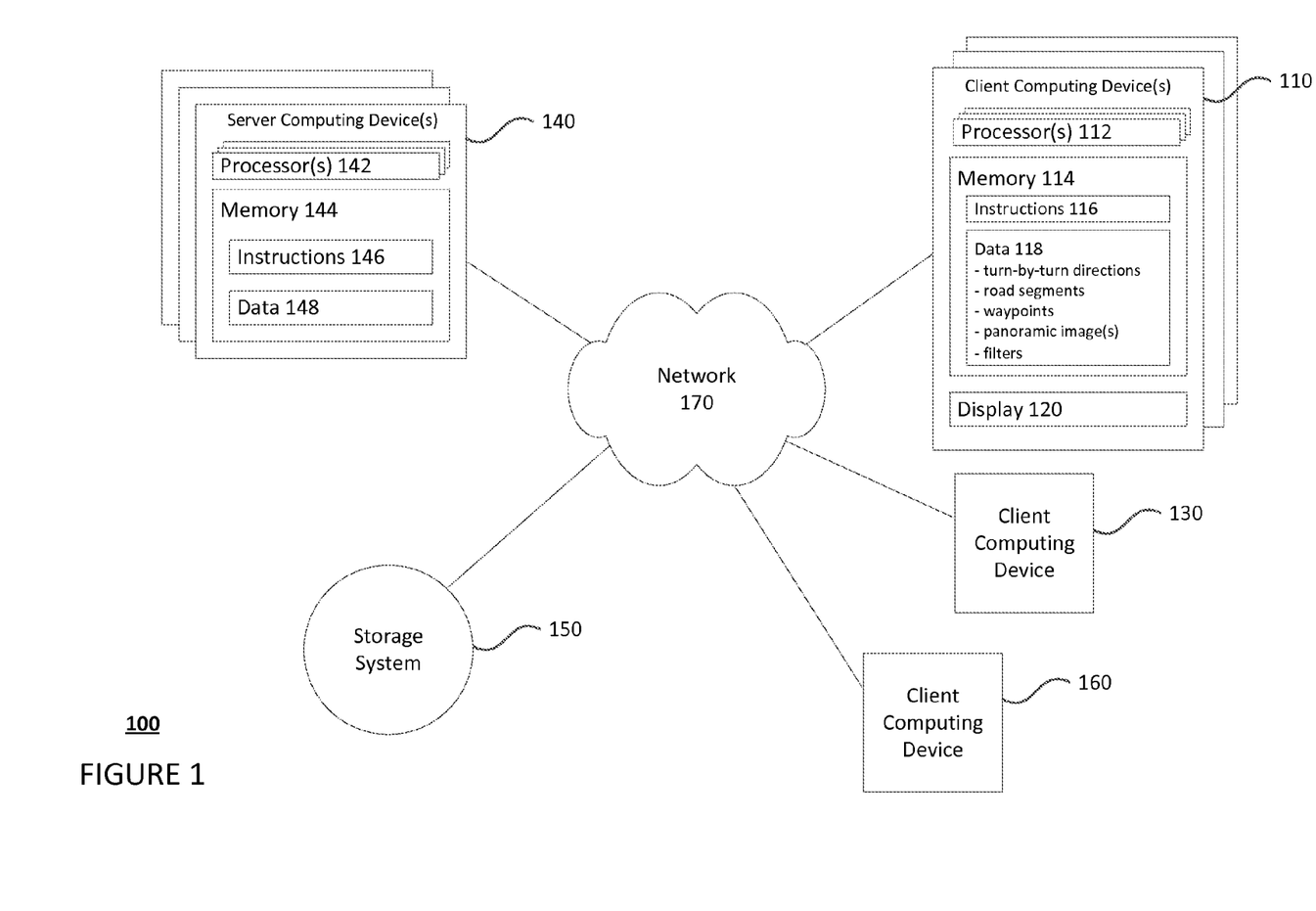
FIG. 1 is a functional diagram of a system in accordance with aspects of the disclosure.
Figure 2:
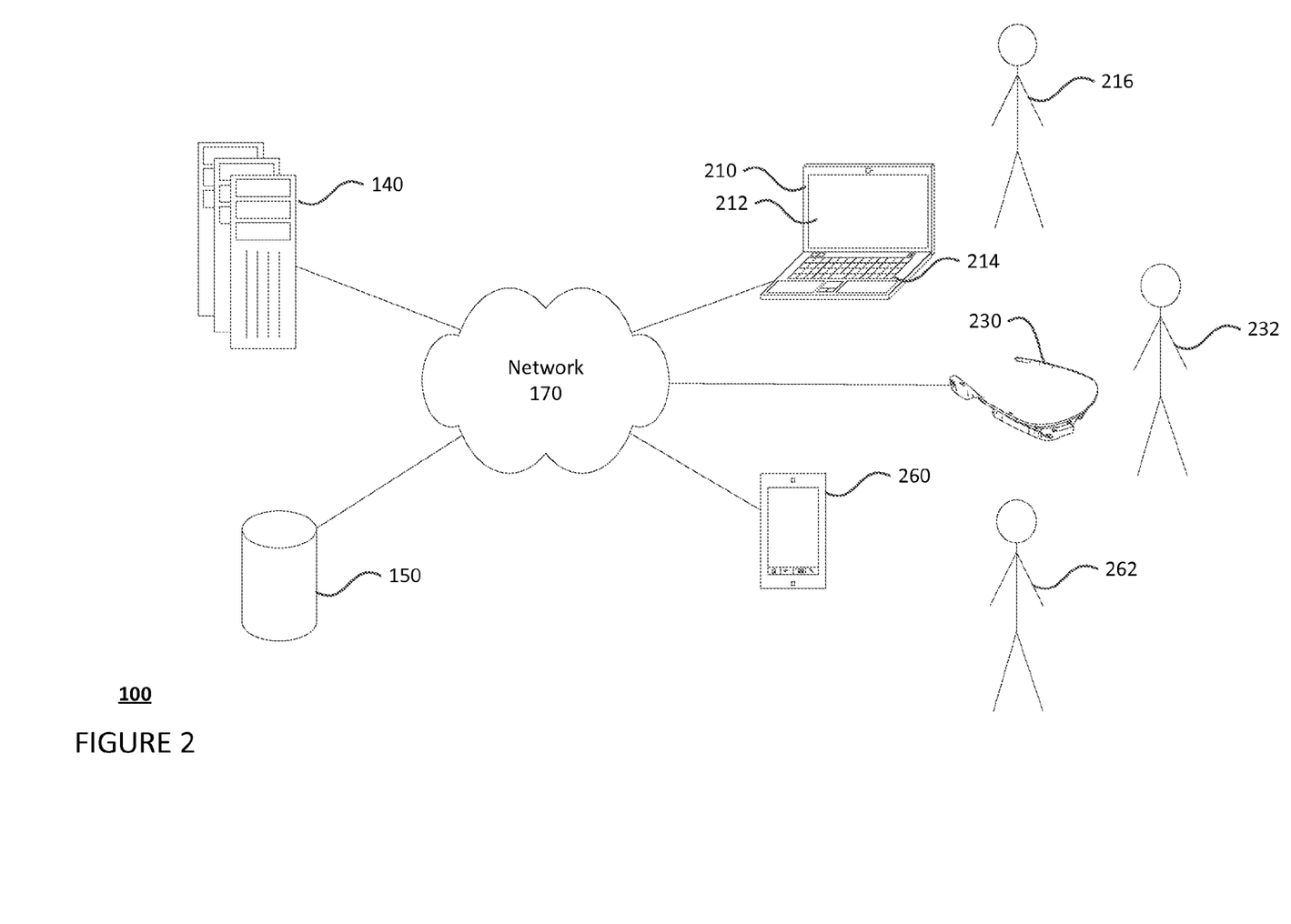
FIG. 2 is a pictorial diagram of an example system in accordance with aspects of the disclosure.

FIGS. 1 and 2 illustrate one possible system 100 in which the aspects disclosed herein may be implemented. In FIG. 1, system 100 may include client computing devices 110, 130 and 160. As shown, the one or more client computing devices 110 may contain one or more processors 112, a memory 114, a display 120 and other components typically present in general purpose computing devices. Although FIG. 1 functionally represents each of the processor 112 and memory 114 as a single block within the one or more client computing device 110, which is also represented as a single block, the system may include and the methods described herein may involve multiple processors, memories and devices that may or may not be stored within the same physical housing. For instance, various examples and methods described below as involving a single component (e.g., one or more processors 112) may involve a plurality of components (e.g., multiple computing devices distributed over a network of computing devices, computers, "racks," etc. as part of a parallel or distributed implementation; further, the various functions performed by the embodiments may be executed by different computing devices at different times as load is shifted from among computing devices). Similarly, various examples and methods described below as involving different components (e.g., client computing devices 110, 130 and 160) may involve a single component (e.g., rather than client computing device 130 performing a determination described below, client computing device 130 may send the relevant data to the one or more client computing devices 110 for processing and receive the results of the determination for further processing or display).

Memory 114 of the one or more client computing devices 110 may store information accessible by the one or more processors 112, including instructions 116 that may be executed by the processor(s). Memory 114 may also include data 118 that may be retrieved, manipulated or stored by the one or more processors 112. Memory 114 and the other memories described herein may be any type of storage capable of storing information accessible by the relevant processor, such as a hard-disk drive, a solid state drive, a memory card, RAM, ROM, DVD, write-capable memory or read-only memories. In addition, the memory may include a distributed storage system where data, such as data 118, is stored on a plurality of different storage devices which may be physically located at the same or different geographic locations.

The instructions 116 may be any set of instructions to be executed by the one or more processors 112 or other computing devices. In that regard, the terms "instructions," "application," "steps" and "programs" may be used interchangeably herein. The instructions may be stored in object code format for immediate processing by a processor, or in another computing device language including scripts or collections of independent source code modules, that are interpreted on demand or compiled in advance. Functions, methods and routines of the instructions are explained in more detail below. The one or more processors 112 may each be any conventional processor, such as a commercially available central processing unit ("CPU") or a graphics processing unit ("GPU"). Alternatively, the processors may be a dedicated component such as an application-specific integrated circuit ("ASIC"), a field programmable gate array ("FPGA"), or other hardware-based processor.

Data 118 may be retrieved, stored or modified by the one or more client computing devices 110 in accordance with the instructions 116. For instance, although the subject matter described herein is not limited by any particular data structure, the data may be stored in computer registers, in a relational database as a table having many different fields and records, or XML documents. The data may also be formatted in any computing device-readable format such as, but not limited to, binary values, ASCII or Unicode. Moreover, the data may comprise any information sufficient to identify the relevant information, such as numbers, descriptive text, proprietary codes, pointers, references to data stored in other memories such as at other network locations, or information that is used by a function to calculate the relevant data. As discussed in more detail below with regard to FIGS. 3-6, data 118 may comprise, for example, at least turn-by-turn directions, road segments, waypoints, panoramic images associated with various road segments, filtering parameters, etc.

Display 120 and other displays described herein may be any type of display, such as a monitor having a screen, a touch-screen, a projector, or a television. The display 120 of the one or more computing devices 110 may electronically display information to a user via a graphical user interface ("GUI") or other types of user interfaces. For example, as will be discussed below, display 120 may electronically display a web browser including a map interface with turn-by-turn directions between two geographic locations, corresponding road segments, and waypoints.

In addition, the client computing devices 110, 130 and 160 may be at one node of a network 170 and capable of directly and indirectly communicating with other nodes of network 170, such as one or more server computing devices 140 and a storage system 150. Although only a few computing devices are depicted in FIG. 1, a typical system may include a large number of connected computing devices, with each different computing device being at a different node of the network 170. The network 170 and intervening nodes described herein may be interconnected using various protocols and systems, such that the network may be part of the Internet, World Wide Web, specific intranets, wide area networks, or local networks. The network may utilize standard communications protocols, such as Ethernet, Wi-Fi and HTTP, protocols that are proprietary to one or more companies, and various combinations thereof. Although certain advantages are obtained when information is transmitted or received as noted above, other aspects of the subject matter described herein are not limited to any particular manner of transmission of information.

As an example, one or more server computing devices 140 may be a web server that is capable of communicating with the one or more client computing devices 110 via the network 170. As discussed in more detail below with regard to FIG. 2, the client computing devices 110, 130 and 160 may be client computing devices or other user devices, and the one or more server computing devices 140 may provide information for display by using network 170 to transmit and present information to a user of the client computing devices 110, 130 and 160.

As another example, storage system 150 may store various turn-by-turn directions, road segments, waypoints, images to include in a turn-by-turn direction preview, image data, image features, filters, etc., in addition to the ones stored in data 118. The stored road segments may be sued to determine a set of turn-by-turn directions and a route. Additionally, the storage system 150 may store images and unique identifiers associated with road segments. For example, the images may be street level panoramic images, photographs, pictures, etc. The unique identifiers may describe the road segment's overall shape, orientation, location, speed limits, landmarks and/or establishments.

An example of a street level image is an image of geographic objects, people and/or objects that were captured by a camera at an angle generally perpendicular to the ground, or where the camera is positioned at or near the ground level. Thus, the street level image may represent various geographic objects, such as buildings, a sidewalk, streets, vehicles, people, street lights, signs, advertisements, trees, sculptures, bodies of water, storefronts, landmarks, etc.

Images such as panoramic images may also be associated with information indicating the orientation of the image. For example, if the street level image comprises a typical photograph, the orientation may simply be the camera angle. If the street level images are panoramic images, such as 360° panoramas centered at the geographic location associated with the image, the orientation may indicate that portion of the image that corresponds with looking due north from the camera position at an angle directly parallel to the ground. Further, the above-described images may also include metadata, which may include the location of the image (e.g., GPS coordinates), time of day or time of year, orientation of the device (e.g., angle, pitch, roll and/or compass point), accelerometer information, accuracy of the GPS location, GPS location statistics (e.g., urban vs. rural vs. wilderness), etc.

As with memory 114, storage system 150 can be of any type of computerized storage capable of storing information accessible by the one or more server computing devices 140, such as hard-drive, memory card, ROM, RAM, DVD, CD-ROM, write-cable, and read-only memories. Moreover, storage system 150 may include a distributed storage system where data is stored on a plurality of different storage devices that may be physically located at the same or different geographic locations. Storage System 150 may be connected to the client computing devices via the network 170 as shown in FIG. 1 and/or may be directly connected to or incorporated into any of the client computing devices, e.g., 110, 130 and 160 (not shown). In that regard, data 118 stored in memory 114 may be retrieved from storage system 150.

For example, the one or more client computing devices 110 may be a personal computing device 210, such as a laptop, intended for use by a user 216 (shown in FIG. 2). The personal computing device 210 may have all of the components normally used in connection with a personal computing device such as a CPU or GPU, memory storing data and instructions, a display such as display 212 (e.g., a monitor having a screen, a touch-screen, a projector, a television, or other device that is operable to display information), and user input device 214 (e.g., a mouse, keyboard, touch-screen, microphone, etc.). In addition, the personal computing device 210 may also include components (not shown) for determining its position and orientation. For example, these components may include a GPS receiver to determine the device's latitude, longitude and/or altitude as well as an accelerometer, gyroscope or other similar devices.

In another example, client computing device 130 may include a wearable computing device, such as a head-mounted computing system intended for use by a user 232, or a computing bracelet, computing ring, computing watch, etc. In a further example, client computing device 160 may include a mobile computing device 260 intended for use by a user 262 and capable of wirelessly exchanging data with a server over a network such as the Internet. By way of example only, mobile computing device 260 may be a mobile phone or a device such as a wireless-enabled PDA, a tablet PC, or a netbook that is capable of obtaining information via the internet.

The device may be configured to operate with an operating system. In that regard, some of the instructions executed during the operations described herein may be provided by the operating system whereas other instructions may be provided by an application installed on the device. The client computing devices 110, 130 and 160, shown in FIGS. 1 and 2, and other computing devices in accordance with the systems and methods described herein may include other devices capable of processing instructions and transmitting data to and from humans and/or other computers including network computers lacking local storage capability and set top boxes for televisions.

Example Methods

In addition to the operations described above and illustrated in the figures, various operations will now be described. The following operations do not have to be performed in the precise order described below. Rather, various steps can be handled in a different order or simultaneously, and steps may also be added or omitted.

Figure 3:
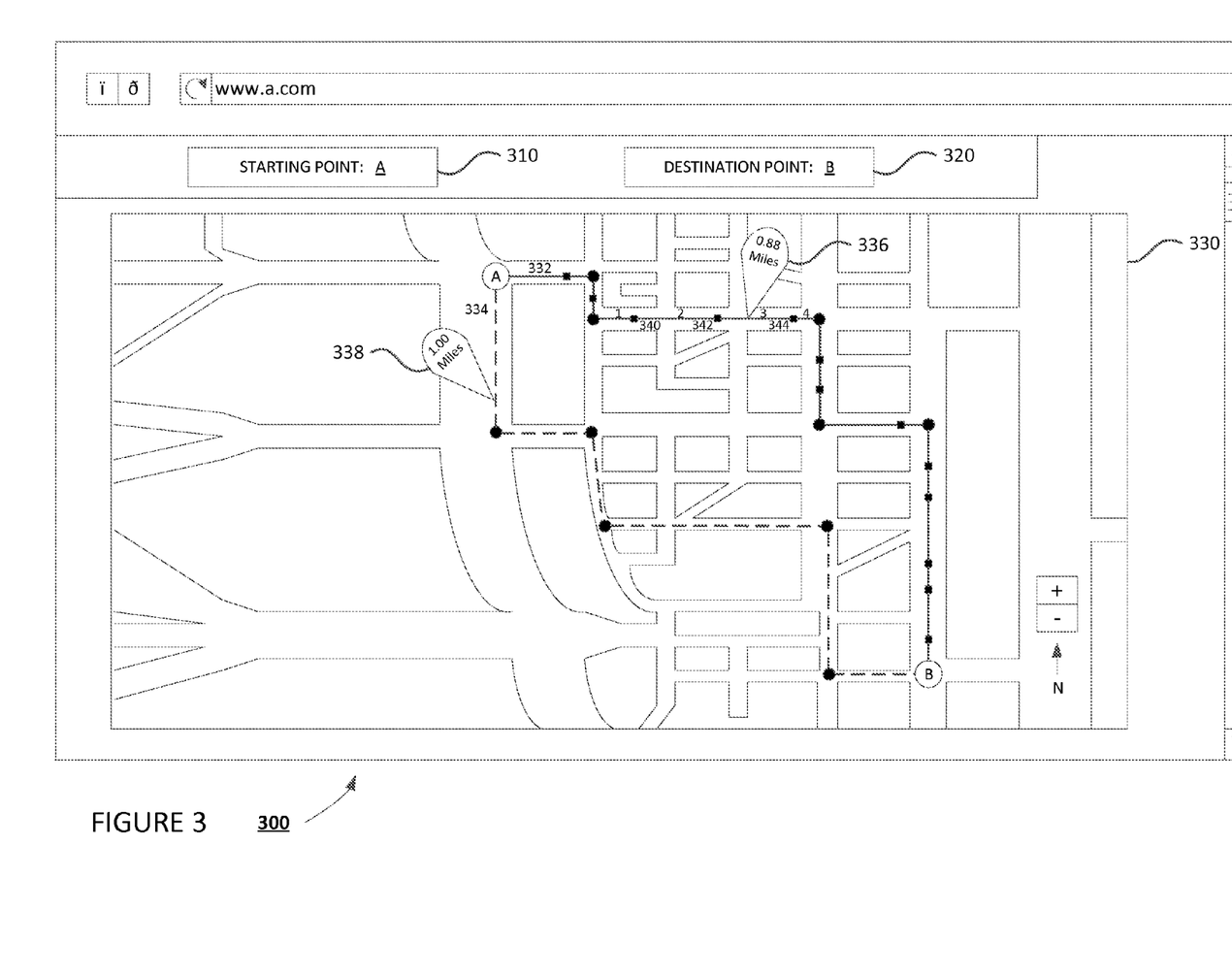
FIG. 3 is an example screen shot in accordance with aspects of the disclosure.

FIG. 3 is an example web-based map interface 300 in accordance with aspects of the disclosure. For example, a user may want to acquire and/or preview turn-by-turn driving directions between geographic location "A" and geographic location "B." In this example, location A is a starting point and location B is a destination point. Initially, the user may open a web browser on his or her client computing device, such as client computing devices 110, 130, or 160. Then, the user may input a URL address (e.g., www.a.com), as shown, to access a web-based map interface to request a preview of turn-by-turn driving directions between locations A and B.

A user may first input information into the web-based map interface 300. For instance, the map interface 300 may include input fields, such as a start field 310 and a destination field 320. Thus, the user may enter location A in the start field 310 and enter location B in the destination field 320. By way of example only, location A may be the address of a restaurant located in a busy metropolitan area and location B may be the address of a pastry shop several blocks across town. While the physical addresses of various locations may be entered as the starting and destination points, a user may also enter other types of information that may allow the map interface 300 to identify a location. For example, a user may input the name of the desired location (e.g., ABC Park, XYZ café) or the type of location (e.g., museum, library, train station). This information may be sent to one or more server computing devices, such as the server computing device 140, to determine turn-by-turn directions for one or more routes and may send the turn-by-turn directions to a client for display, as shown for example, in FIG. 3.

Once a user inputs a starting point and destination point, the one or more server computing devices may display a virtual map including one or more sets of turn-by-turn directions connecting the two locations. For example, as shown in FIG. 3, a map 330 may display only the relevant geographic area spanning locations A and B. If desired, the user can zoom in or zoom out of the geographic area via the plus/minus icon that may be located at the bottom right corner of the map 330. Additionally, the map 330 may also include a set of turn-by-turn directions, the road segments along the turn-by-turn directions, associated waypoints, a marker to indicate overall distance, and other features associated with web-based map interfaces.

In some examples, a map interface may display more than one set of turn-by-turn directions between two geographic locations. As depicted in FIG. 3, map 330 may include two different sets of turn-by-turn directions connecting locations A and B. In one example, a first set of turn-by-turn directions 332 is represented by solid lines. In another example, a second set of turn-by-turn directions 334 is represented by dashed lines.

The map interface 300 may also include various information markers on map 330, such as distance markers 336 and 338, to further inform the user about the turn-by-turn directions. For instance, distance marker 336 indicates that that the first set of turn-by-turn directions 332 has an overall distance of 0.88 mile. In another instance, distance marker 338 indicates that the second set of turn-by-turn directions 334 has an overall distance of 1.00 mile. In addition, the map interface may also include time markers (not shown) to indicate how long the user is expected to travel a route, or may also include traffic markers (not shown) to indicate the concentration of traffic flow along a particular route.

As noted above, a set of turn-by-turn directions may include one or more waypoints and one or more road segments between two adjacent waypoints. A waypoint may be considered a point at which a change of direction is required. By way of example only, the first set of turn-by-turn directions 332 may include five different waypoints. In other words, a vehicle, for instance, would have to turn five different times while traveling on the first set of turn-by-turn directions 332. As shown, the turn sequence may be a: (1) right turn, (2) left turn, (3) right turn, (4) left turn and then (5) right turn. In addition, the first set of turn-by-turn directions 332 may also include nineteen road segments connecting between starting point A and destination point B. A road segment may be described by its shape, geographic orientation, geographic location, speed limits along the road segment, associated images, etc.

In one example, there may be four road segments between two waypoints. As shown, road segment 1 is formed between a waypoint and a road marker 340. Road segment 2 is formed between the road marker 340 and another road marker 342. Similarly, road segment 3 is formed between the road marker 342 and a third road marker 344. Further, road segment 4 is formed between the road marker 344 and another waypoint. A road marker, for instance, may represent a traffic event (e.g., stop sign, traffic light, pedestrian crosswalk, etc.) or a particular landmark (e.g., restaurant, museum, post office, etc.).

In another example, the second set of turn-by-turn directions 334 also includes five different waypoints. The turn sequence for the second set of turn-by-turn directions 336 may be a: (1) left turn, (2) right turn, (3) left turn, (4) right turn and then (5) left turn. Similar to the first set of turn-by-turn directions 332, the second set of turn-by-turn directions 334 may include a plurality of road segments in between the adjacent waypoints (not shown). One example advantage of displaying more than one set of turn-by-turn directions on map 330 is that it may give the user the option to select a particular set of directions based on real-time events, such as traffic, construction, accidents, etc.

While map 330 of FIG. 3 depicts a relatively small metropolitan area, the map interface 300 may also display a map of a large geographic area, such as a map that spans one coast of a country to an opposite coast. Further, while the above-described examples involve driving directions, the turn-by-turn directions may not be limited to just driving directions for vehicles, but also walking directions, biking directions, etc.

Figure 4:
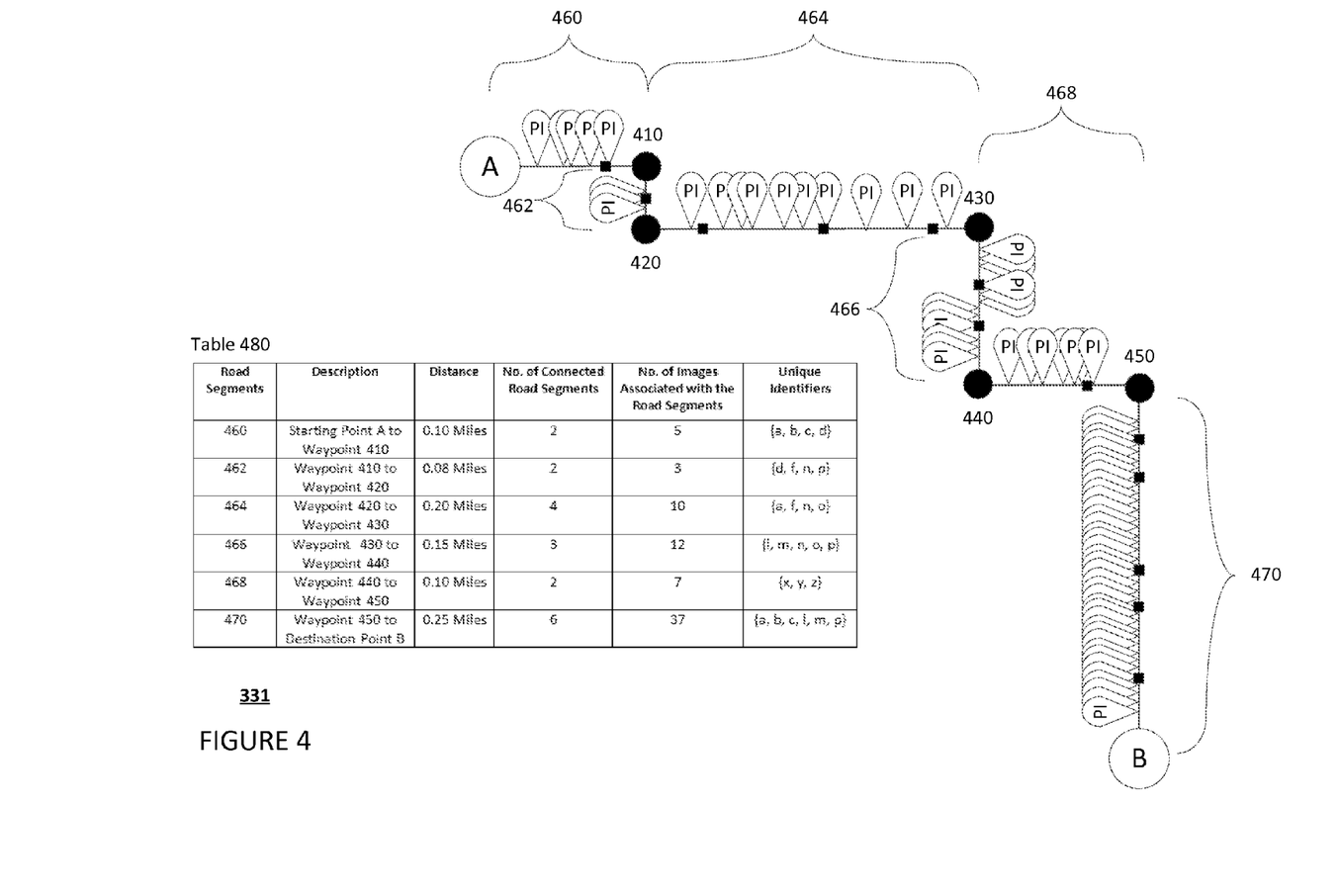
FIG. 4 is a diagram of example turn-by-turn directions in accordance with aspects of the disclosure.

FIG. 4 includes a diagram of turn-by-turn directions 332 depicted in map 330. As noted above, there are five different waypoints 410, 420, 430, 440 and 450 between starting point A and destination point B in turn-by-turn direction 332. As shown, road segments 460 connect starting point A and waypoint 410. Road segments 462 connect waypoints 410 and 420. Further, road segments 464 connect waypoints 420 and 430. Road segments 466 connect waypoints 430 and 440. Likewise, road segments 468 connect waypoints 440 and 450. And road segments 470 connect waypoint 450 and destination point B. As noted above, the road segments of the set of turn-by-turn direction may be associated with sets of images. For example, the road segments 460, 462, 464, 466, 468 and 470 may be associated with one or more images. These images may include street level panoramic images, as indicted by "PI," as shown. In that regard one or more of the panoramic images may be selected, filtered and/or strung together to generate a turn-by-turn direction preview.

In one example, one or more tables may be used to depict a set of turn-by-turn directions and associated information. By way of example only, a table 480 may include six separate columns. The first column may include road segments 460, 462, 464, 466, 468 and 470 of a user selected set of turn-by-turn directions. The second column may include descriptions for each of the road segments in the first column, such as the end-to-end points along the directions. For example, a description for road segments 462 may include that the road segments connect from waypoints 410 to 420. The third column may contain the overall distance of each the connected road segments. The fourth column may include the number of road segments that are connected along the respective road segments. The fifth column may include the number of images that are associated with the road segments. The sixth column may contain one or more unique identifiers associated with any of the aforementioned columns. In one instance, the unique identifiers may describe the shape, orientation, location, speed limits, traffic events, etc. of a particular road segment. The unique identifiers may also include metadata of the above-described images associated with a particular road segment, such as timestamps, location, image angle, etc.

In addition to depicting turn-by-turn directions, a table may also organize information associated with the turn-by-turn directions. For instance, the last row of table 480 may show that road segments 470 connects waypoint 450 and destination point B, which covers a total distance of 0.25 miles along six different road segments and has 37 associated images. Table 480 may further show that the six road segments of road segments 470 correspond to unique identifiers "a," "b," "c," "1," "m" and "p." For example, "a" may indicate that all the road segments are oriented north to south. In another example, "b" may specify that the speed limit along all the road segments is 25 miles per hour. In yet another example, "p" may indicate that the road segments are all relatively straight. While the unique identifiers a, b, c, 1, m and p are based on descriptions that may be shared in common among all the road segments, the unique identifiers may also be individually associated with one particular road segment or one particular image. In that regard, information associated with the set of turn-by-turn directions may be readily accessible, for example, by one or more computing devices when generating a turn-by-turn direction preview.

Once a set of turn-by-turn directions, associated road segments and images are identified, a turn-by-turn direction preview of the route may be generated. As will be further discussed below, the identified images associated with a particular road segment or a series of road segments may be filtered before generating the turn-by-turn direction preview. Then, the filtered images associated with the road segments may be strung together into a larger set of images for the turn-by-turn direction preview.

Since a large number of images may be associated with each road segment, one or more computing devices may implement filtering techniques to remove at least some of the images for various reasons. Those reasons may include maximizing image resolution, processing speeds, or skipping over repetitive and/or irrelevant imagery.

Figure 5:
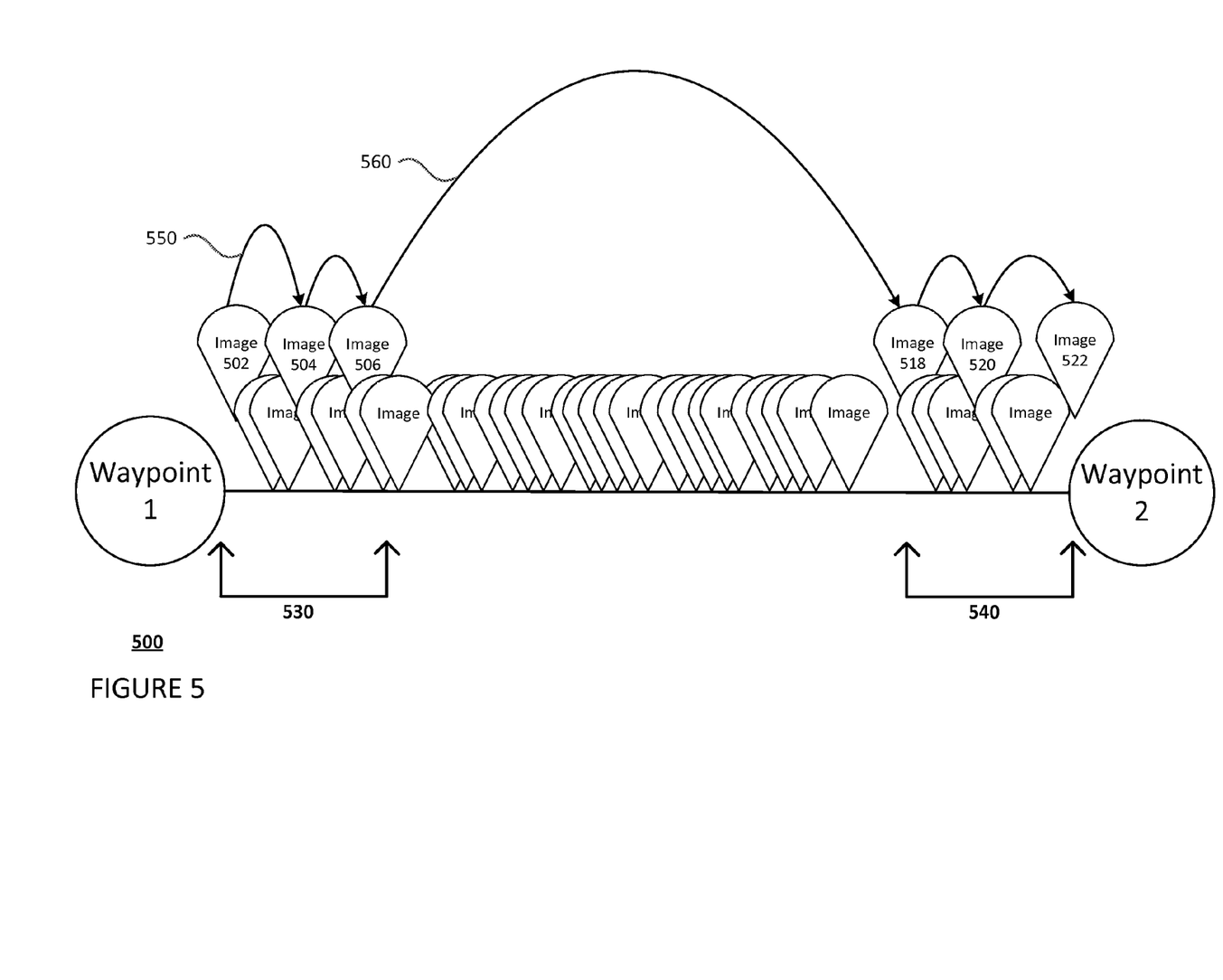
FIG. 5 is an example of an image filtering technique in accordance with aspects of the disclosure.

In one example, the images within a threshold distance of the waypoints of a particular direction may be used to generate the turn-by-turn direction preview, while images outside of the threshold distance may be excluded from the preview. FIG. 5 illustrates an example image filtering technique 500 using a threshold distance. By way of example only, the images outside a certain threshold distance from waypoints 1 and 2 may be discarded. Bracket 530 may represent a threshold distance. The magnitude of the threshold distance may vary based on the waypoint. For instance, if the waypoint is a highway exit, the threshold distance may be relatively large, such as one mile, or more or less. However, if the waypoint is a turn at a neighborhood intersection, the threshold distance may relatively small, such as a half a mile, or more or less. In the example of FIG. 5, one or more of the first eight images adjacent to waypoint 1 may be included in the turn-by-turn direction preview since they are within the bracket 530. Similarly, one or more of the last eight images adjacent to waypoint 2 may be included in the preview since they are within a bracket 540, which may also represent a threshold distance.

In this regard, other images may not be included or may be filtered from the set of images of the turn-by-turn direction preview.

Another filtering technique may be based on a threshold number of images. For example, only a threshold number of images between adjacent waypoints may be included in a turn-by-turn direction preview, while the images outside the threshold number may be excluded from the preview. The threshold number may vary depending on the overall distance of the road segments. If the distance of the road segments is relatively long, such as 80 miles (more or less), then the threshold number may be high. If the distance is relatively short, such as 0.5 mile (more or less), then the threshold number may be low. Referring back to the example of FIG. 5, the first eight images adjacent to waypoint 1 and the last eight images adjacent to waypoint 2 may be further filtered based on a threshold number, such as six. In that regard, images 502, 504 and 506 near waypoint 1 as well as images 518, 520 and 522 near waypoint 2 may be included in the turn-by-turn direction preview. The other ten images within brackets 530 and 540 may be excluded from preview. The selection of the images may be based on various factors, such as including the images at predetermined intervals along a distance, or including images of particular landmarks.

In a further example, only images at predetermined intervals along each road segment between two adjacent waypoints may be included in a turn-by-turn direction preview. For instance, in the example image filtering technique 600 of FIG. 6, a predetermined interval may be every eighth mile along an 80 mile stretch of connected road segments between waypoints 1 and 2. As shown, image 602 corresponds with the 0 mile mark (e.g., zero middles from waypoint 1 along the road segments between waypoints 1 and 2), image 604 corresponds with the 8 mile mark, image 606 with the 16 mile mark, image 608 with the 24 mile mark, image 610 with the 32 mile mark, image 612 with the 40 mile mark, image 614 with the 48 mile mark, image 616 with the 56 mile mark, image 618 with the 64 mile mark, image 620 with the 72 mile mark and image 622 with the 80 mile mark. Thus, only 11 images out of the numerous images spanning the long stretch of road between waypoints 1 and 2 may be included in the set of images of the turn-by-turn direction preview. In that regard, the other images may be excluded or filtered.

In yet another example, a filtering technique may be based on selecting distinguishing points along one or more road segments and including images corresponding to those points in the preview. For example, the transition from a road to a bridge, road to a tunnel, or from a local road to a major highway may be considered a distinguishing point. Thus, images depicting these transitions may be included in the turn-by-turn direction preview. Various landmarks along a route may also be considered distinguishing points. A landmark may include restaurants, museums, post offices, tourist attractions, bodies of water, parks, etc. Moreover, landmarks may be based on visitation data or metadata associated with the images (e.g., oft-visited vista points) or popularity, including how many times photos have been taken of an area or object. For instance, photos of a water tower along a road segment that resembles a golf ball may be taken more frequently than a regular water tower. In that regard, the water tower that resembles a golf ball may be considered a landmark.

In another example, a filtering technique may be based on one or more matching image features between various images. By way of example only, the one or more image features may correspond to distinguishable sections of images that match-up between different sections of panoramas. For instance, the distinguishable section may include a particular object, a landmark, etc., indicating that the object, landmark, etc. is in the same location/spot of multiple images. Thus, the filtering technique may be based on a specific number of image features, which may vary from low to high, to include in the set of images of the turn-by-turn direction preview. In this regard, not only are repetitive images excluded from the turn-by-turn direction preview, but the visual transitions between the images included in the turn-by-turn direction preview may be improved since the images share common features.

Figure 6:
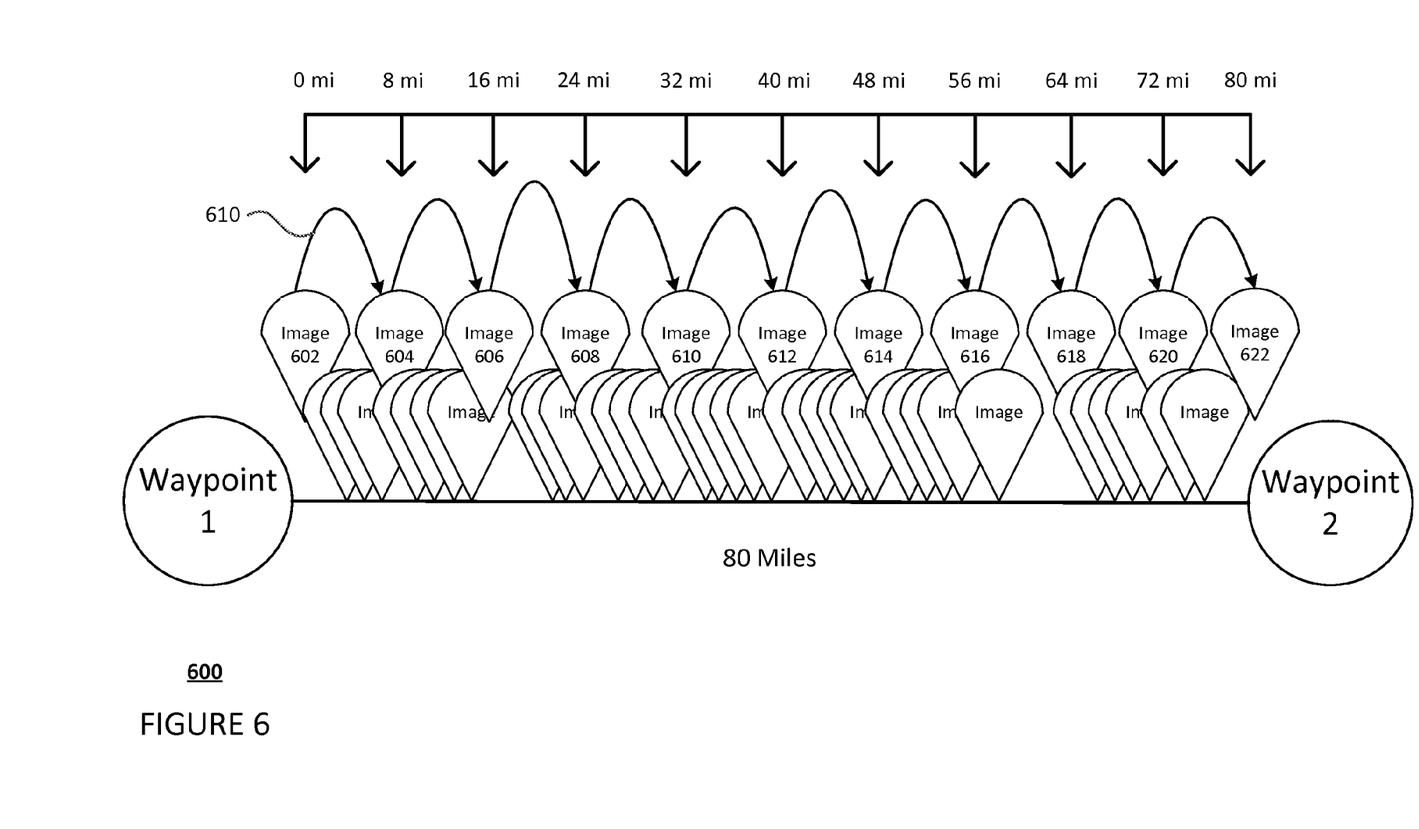
FIG. 6 is another example of an image filtering technique in accordance with aspects of the disclosure.

While FIG. 5 shows a combination of two different filtering techniques, more filtering techniques may be applied. For example, images within a threshold distance of a waypoint at certain distance intervals and only those associated with distinguishing points may be included in the turn-by-turn direction preview. Moreover, as shown in FIG. 6, individual filtering techniques may also be applied.

In order to avoid a sense of disconnect where there are large physical distances between images, a turn-by-turn direction preview may include different types of transitions between those images. In the example of FIG. 5, a transition 550 from image 502 to image 504 may be a jump from a street level view to an aerial view (e.g., apex of transition 550) and then back down to a street level view. A similar transition may be implemented between image 504 and image 506. In a transition spanning a large physical distance, for example from image 506 to image 518, transition 560 may be a jump from a street level view of image 506 to a higher aerial view than the aerial view associated with transition 550 and then back down to a street level view of image 518. In the example of FIG. 6, the transitions from one image to another may be relatively similar. Similar to the transitions depicted in FIG. 5, transition 610 from image 602 to image 604 may be a jump from a street level view to an aerial view, then back down to the street level view of image 604.

Figure 7:
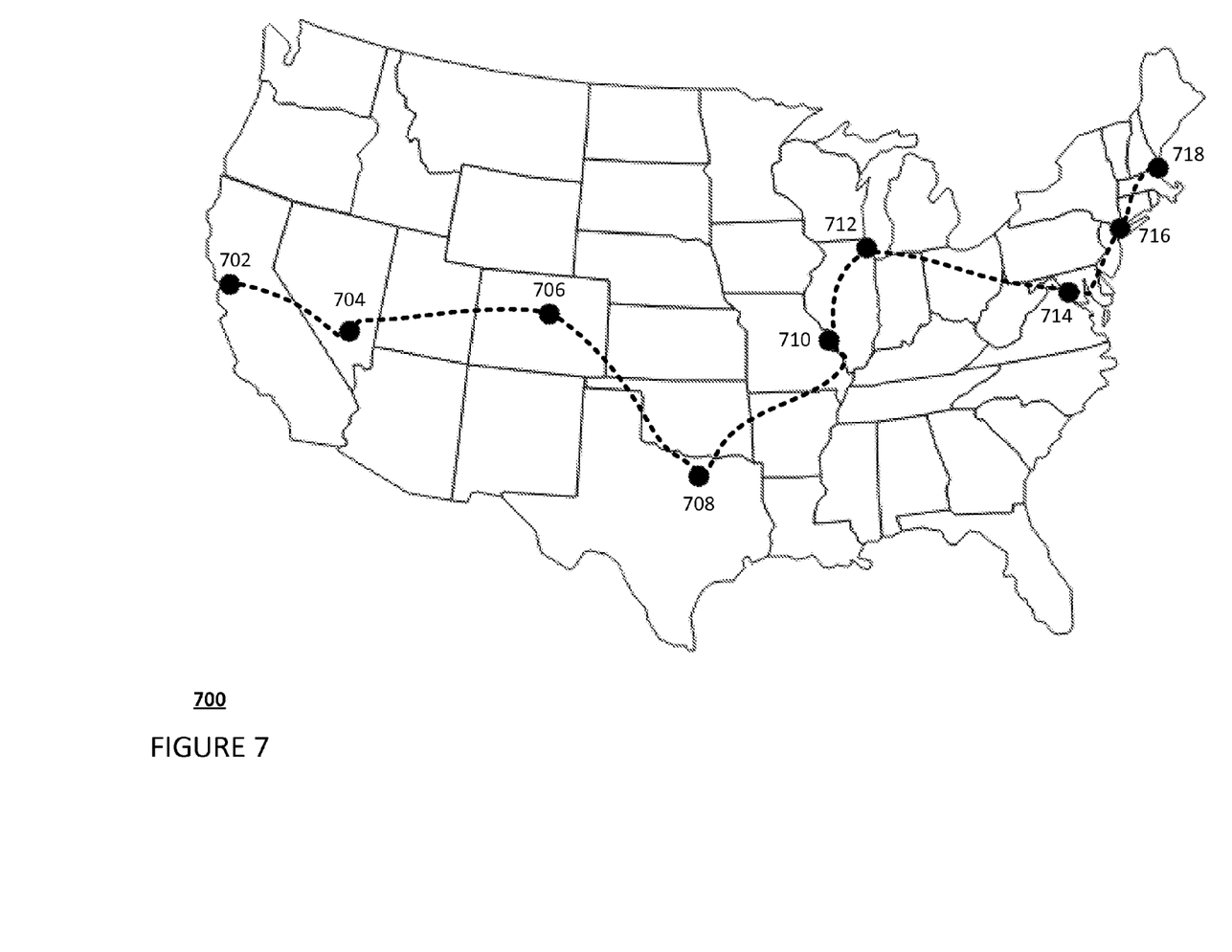
FIG. 7 is an example of map data in accordance with aspects of the disclosure.

When images span across large geographic regions, such as an entire country, the transitions from one image to another may include a map display of the country. For example, FIG. 7 is an example map display 700 of turn-by-turn directions from one coast of a country to an opposite coast. For example, a user may request a turn-by-turn direction preview from a starting point 702 located on the west coast of the United States (e.g., Santa Clara, Calif.) to a destination point 718 on the east coast (e.g., Boston, Mass.). In this regard, the one or more computing devices may designate various cities in between the starting and destination points (e.g., the two coasts) as the major waypoints 704, 706, 708, 710, 712, 714 and 716 of the generated set of turn-by-turn directions. Here, for example, the major waypoints 704, 706, 708, 710, 712, 714 and 716 may be Las Vegas, Denver, Dallas, St. Louis, Chicago, Washington D.C. and New York City, respectively. Thus, the turn-by-turn direction preview may not have to display all the images associated with the road segments between the major waypoints. Instead, the preview may transition an image from one major waypoint to an image in another major waypoint by displaying a map, as depicted in FIG. 7, and including dashed lines connecting the two major waypoints.

Figure 8:
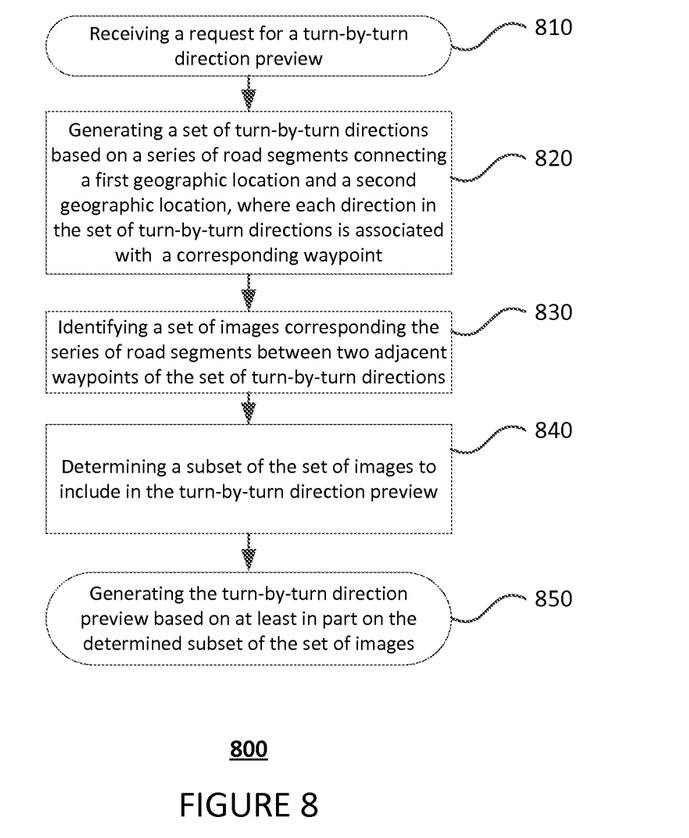
FIG. 8 is an example flow diagram in accordance with aspects of the disclosure.

FIG. 8 is a flow diagram 800 of an example method of generating a turn-by-turn direction preview. At block 810, one or more computing devices may receive a request from a user for a turn-by-turn direction preview. At block 820, the one or more computing devices may generate a set of turn-by-turn directions based on a series of road segments connecting a first geographic location and a second geographic location, where each turn-by-turn direction includes a corresponding waypoint. In this example, the first geographic location may be the starting point that the user enters on the map interface and the second geographic location may be the destination point.

At block 830, the one or more computing devices may identify a set of images corresponding the series of road segments between two adjacent waypoints of the set of turn-by-turn direction. As discussed above, one example method of identifying information associated with road segments, or the like, is the use of a table organizing the information, such as the table 480 shown in FIG. 4. Subsequently, the one or more computing devices may determine a subset of the set of images to include in the turn-by-turn direction preview, at block 840. At block 850, the one or more computing devices generate the turn-by-turn direction preview based on at least in part on the determined subset of the set of images.

Figure 9:
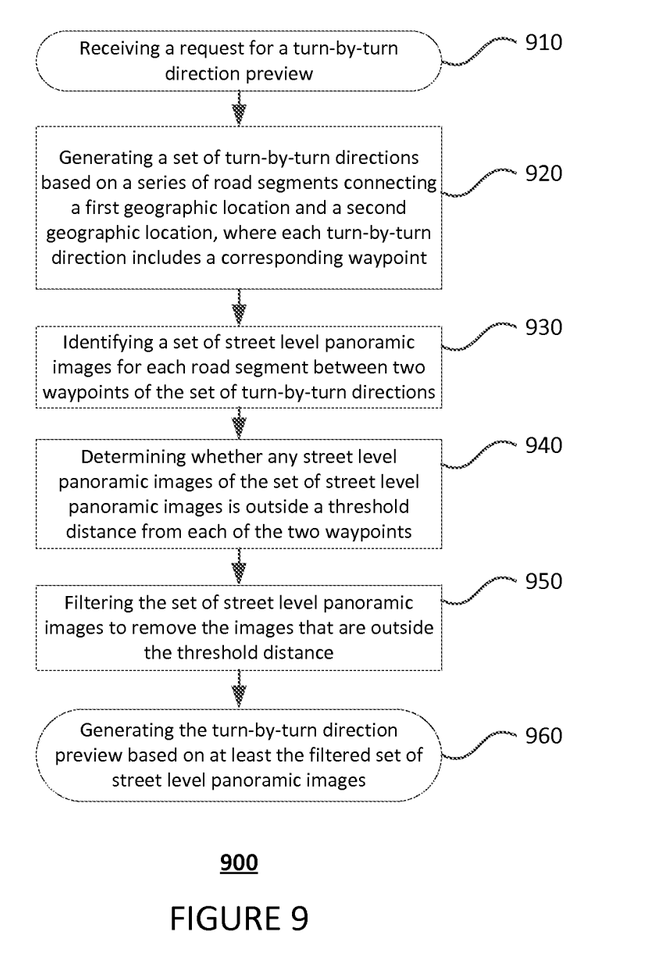
FIG. 9 is another example flow diagram in accordance with aspects of the disclosure.

FIG. 9 is a flow diagram 900 of another example method of generating a turn-by-turn direction preview. Similar to the example method of flow diagram 800, one or more computing devices may receive a request for a turn-by-turn direction preview at block 910. At block 920, the one or more computing devices may generate a set of turn-by-turn directions based on a series of road segments connecting a first geographic location and a second geographic location, where each turn-by-turn direction includes a corresponding waypoint. Then, at block 930, a set of street level panoramic images for each road segment between two adjacent waypoints of the set of turn-by-turn directions may be identified.

At block 940, the one or more computing devices may determine whether any street level panoramic images of the set of street level panoramic images is outside a certain threshold distance from each of the two adjacent waypoints. This determination may be based on the above-discussed filtering technique with respect to FIGS. 5 and 6. Based on this determination, the set of panoramic images may be filtered to remove the street level panoramic images that are outside the threshold distance, at block 950. Subsequently, the one or more computing devices may generate the turn-by-turn direction preview based on at least the filtered set of street level panoramic images for the user, at block 960.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for generating turn-by-turn direction previews, comprising:
    receiving, using one or more computing devices, a request for a turn-by-turn direction preview;
    generating, using the one or more computing devices, a set of turn-by-turn directions based on a series of road segments connecting a first geographic location and a second geographic location, wherein each direction in the set of turn-by-turn directions is associated with a corresponding waypoint;

identifying, using the one or more computing devices, a set of images corresponding the series of road segments between two adjacent waypoints of the set of turn-by-turn directions;

determining, using the one or more computing devices, a subset of the set of images to include in the turn-by-turn direction preview by filtering the set of images to include only the images within a threshold distance from the waypoint corresponding to each turn-by-turn direction; and generating, using the one or more computing devices, the turn-by-turn direction preview based on at least in part on the determined subset of the set of images.

2. The method of claim 1, wherein the set of images includes one or more street level panoramic images.

3. The method of claim 1, further comprising providing for display, using the one or more computing devices, the turn-by-turn direction preview on a client computing device.

4. The method of claim 3, wherein the turn-by-turn direction preview includes jumping from a first image to a second image.

5. The method of claim 1, wherein the determining further comprises filtering the set of images to remove any images that exceeds a predetermined quantity of images designated for each of the road segments to determine the subset.

6. The method of claim 1, wherein the determining further comprises filtering the set of images to include only the images at predetermined distance intervals along each of the road segments.

7. The method of claim 1, wherein the determining further comprises filtering the set of images to include the images of one or more landmarks along each of the road segments.

8. The method of claim 1, further comprising:
identifying, using the one or more computing devices, additional sets of images corresponding the series of road segments between additional adjacent waypoints of the set of turn-by-turn directions; and
determining, using the one or more computing devices, additional subsets of the additional sets of images to include in the turn-by-turn direction preview.

9. A system comprising:
a memory;
one or more computing devices, each of the one or more computing devices having one or more processors, the one or more computing devices being coupled to the memory;
wherein the one or more computing devices are configured to:
receive a request for a turn-by-turn direction preview;
generate a set of turn-by-turn directions based on a series of road segments connecting a first geographic location and a second geographic location, wherein each turn-by-turn direction includes a corresponding waypoint;
identify a set of images corresponding the series of road segments between two adjacent waypoints of the set of turn-by-turn directions;
determine a subset of the set of images to include in the turn-by-turn direction preview by filtering the set of images to remove any images that exceeds a predetermined quantity of images designated for each of the road segments to determine the subset; and
generate the turn-by-turn direction preview based on at least in part on the determined subset of the set of images.

10. The system of claim 9, wherein the set of images includes one or more street level panoramic images.

11. The system of claim 9, wherein the one or more computing devices are further configured to provide for display the turn-by-turn direction preview on a client computing device.

12. The system of claim 11, wherein the turn-by-turn direction preview includes jumping from a first image to a second image.

13. The system of claim 9, wherein the one or more computing devices are further configured to determine a subset of the set of images by filtering the set of images to include only the images within a threshold distance from the waypoint corresponding to each turn-by-turn direction.

14. The system of claim 9, wherein the one or more computing devices are further configured to determine a subset of the set of images by filtering the set of images to include only the images at predetermined distance intervals along each of the road segments.

15. The system of claim 9, wherein the one or more computing devices are further configured to determine a subset of set of images by filtering the set of images to include images of one or more landmarks along each of the road segments.

16. The system of claim 9, wherein the one or more computing devices are further configured to:
identify additional sets of images corresponding the series of road segments between additional adjacent waypoints of the set of turn-by-turn directions; and
determine additional subsets of the additional sets of images to include in the turn-by-turn direction preview.

17. A non-transitory, tangible computer-readable medium on which instructions are stored, the instructions, when executed by one or more computing devices perform a method, the method comprising:
receiving a request for a turn-by-turn direction preview;
generating a set of turn-by-turn directions based on a series of road segments connecting a first geographic location and a second geographic location, wherein each turn-by-turn direction includes a corresponding waypoint;
identifying a set of street level panoramic images for each road segment between two adjacent waypoints of the set of turn-by-turn directions;
determining whether any street level panoramic images of the set of street level panoramic images is outside a threshold distance from each of the two adjacent waypoints;
based on the determination, filtering the set of street level panoramic images to remove the street level panoramic images that are outside the threshold distance; and
generating the turn-by-turn direction preview based on at least the filtered set of street level panoramic images.

18. The non-transitory, tangible computer-readable medium of claim 17, the method further comprising providing for display the turn-by-turn direction preview on a client computing device.

* * * * *